United States Patent Office 3,749,553
Patented July 31, 1973

3,749,553
MODIFICATION OF WOOL WITH VINYL-
PYRIDINE AND ZINC CHLORIDE
Nathan H. Koenig, Albany, and Mendel Friedman,
Moraga, Calif., assignors to the United States of America as represented by the Secretary of Agriculture
No Drawing. Filed Dec. 1, 1971, Ser. No. 203,883
Int. Cl. D06m 3/02, 13/36
U.S. Cl. 8—127.6                        2 Claims

ABSTRACT OF THE DISCLOSURE

Wool is modified, in the absence of added water, by reaction with an aromatic heterocyclic compound having a vinyl group attached to the heterocyclic ring (e.g., vinylpyridine) and zinc chloride at elevated temperatures. The reagents are applied to the wool in a suitable organic solvent. The so-modified wool is much more resistant to laundering shrinkage than is normal wool.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates broadly to the chemical modification of wool. In particular, the invention concerns and has as its prime object the provision of novel processes wherein wool is chemically modified by reacting it with vinylpyridine and zinc chloride. The unqualified term "vinylpyridine" used herein includes 2-, 3-, and 4-vinylpyridine. It is not meant, however, to limit the invention thusly. In its broad ambit the advantages of the invention can be realized using any aromatic nitrogen heterocyclic compound with a vinyl group attached to the said heterocyclic ring, such as 2-, 3-, and 4-vinylpyridine, 2-, 4-, and 5-vinylpyrimidine, 2- and 3-vinylpyrolle, 3- and 4-vinylpyrazole, 2- and 4-vinylimidazole, 2- and 4-vinyloxazole, 2- and 4-vinylthiazole, 2-, 3-, and 4-vinylquinoline, 1,3-, and 4-vinylquinoline, 2- and 6-vinylpurine, and the like. Moreover, metallic salts other than zinc chloride can be utilized. These salts include, but are not limited to, bromides, fluorides, nitrates, nitrites, phosphates, phosphites, sulfates, sulfites, and so forth, of a nitrogen-complexing metallic ion, such as zinc, cadmium, nickel, tin, copper, and the like.

Further objects of the invention will be apparent from the following description wherein parts and percentages are by weight unless otherwise specified.

Although wool is a very useful fiber, it is often desirable to improve its properties for particular applications by chemically modifying it. Various compounds have been proposed for reaction with wool to produce modified fibers. It is known, for example, that wool can be chemically modified by reacting it with copolymers of the type formed from a monomer containing a single ethylenically unsaturated group, such as an acrylic acid ester of a 1 to 8 carbon alcohol, and a vinylpyridine, such as 4-vinylpyridine.

We have found that wool can be modified by reaction with vinylpyridine and zinc chloride. The zinc chloride acts to activate the vinyl group of the vinylpyridine and facilitates its reaction with the wool, whereby the wool becomes internally modified. Because of these special circumstances, the wool can be modified with moderately high uptakes of the stated co-reactants. These moderately high uptakes confer special improvements on the wool, such as resistance to shrinkage when the treated wool is laundered. Nonetheless, when using the treatment of the present invention, the wool retains its flexibility at these moderately high uptakes.

Another advantage of the invention is that the improvement is essentially permanent; the treated materials do not lose their new properties after long use of cleaning but retain these properties for the life of the material.

Carrying out the process of the invention involves, as a first step, applying to the wool a solution of vinylpyridine and zinc chloride in an inert volatile organic solvent such as acetone or ethanol. Water is not added to the reaction system. Thus the only water in the system will be that present in the wool, normally about 10–15%. In the event that the wool is dried prior to treatment, the reaction will be essentially anhydrous.

Following application of the solution to the wool, the wool is heated to evaporate the solvent and heating is continued to complete the reaction of the wool with the applied co-reactants, whereby to yield the desired modified wool as the end product. The reaction conditions such as proportions of reactants, temperature, and time of heating may be varied as described below.

The vinylpyridine is generally employed in an amount of 10 to 100%, based on the weight of the wool. The amount of zinc chloride is ordinarily about 20–100%, based on the weight of the wool. These co-reactants are dissolved in a volatile organic solvent to facilitate their application to the wool. The amount of the solvent is not critical. However, an amount sufficient to allow facile application of the ingredients to the wool is required; typically, this amount is about 8 times that of the weight of the wool. The wool is placed in said solution and heat is applied to evaporate the solvent and to cause the non-volatile residue of the solution to react with the wool. The temperature can range from 60–150° C., the reaction rate increasing with increasing temperature. To avoid damage to the wool, it is necessary to prevent its internal temperature from rising above 120° C. for more than a few minutes.

The degree of modification of the wool is influenced by the proportion of modifying agents taken up by the fiber, that is, the higher the weight increase, the greater will be the degree of modification of the wool. In general, the weight increase may be varied from 1 to 50%. The time of reaction will vary depending on such factors as the proportion of modifying agents, temperature of reaction, and the degree of modification desired. In general, the reaction may take anywhere from a few minutes to a few hours.

After completion of the reaction as described above, the chemically-modified wool is treated to remove excess reagents. Thus, the wool may be treated as by wringing, passage through squeeze rolls, centrifugation, or the like. Preferably, in place of such mechanical action, or in addition thereto, the modified wool product may be extracted with a hot solvent such as methyl ethyl ketone, ethanol, acetone, benzene, trichloroethylene, carbon tetrachloride, and so forth. Successive extractions with different solvents may be applied to ensure complete removal of all unreacted materials. The treated wool is then dried in the usual way.

The primary advantage of the invention is that the modified wool is more resistant to laundering shrinkage. The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Although the properties of the modified wool indicate that actual combination of the wool with the vinylpyridine and with the zinc chloride (or at least the zinc moiety thereof) has taken place, it is not known for certain what is the mechanism involved. It is believed, however, that the zinc chloride coordinates with the vinylpyridine, thereby increasing the reactivity of the vinyl group. The so-activated vinyl groups react with some of the sites on the wool molecule and probably with other vinyl groups to form a polymeric material. The result is a concentration of vinylpyridine molecules and zinc atoms between individual fibers of the wool. This concentration of the ingredients prevents the fibers from grouping after laundering, thus limiting shrinkage. It may be that other reactions occur and it is not intended to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, polyester, polyamide, and so forth.

The invention is demonstrated by the following illustrative examples.

EXAMPLE I

Circular samples were cut from undyed wool flannel, 7 oz./sq. yd. The fabric was scoured, leached with trichloroethylene followed by ethanol and dried at 120° C. for 1 hour.

The dry fabric sample (1.2 g.), 4-vinylpyridine (0.5 ml.), zinc chloride (0.5 g.), and acetone (10 ml.) were heated at 120° C. for 30 minutes. During this time the acetone was allowed to evaporate. The modified wool was successively extracted with warm methyl ethyl ketone and hot ethanol, to remove unreacted reagents, then dried.

The amounts of zinc chloride and 4-vinylpyridine were varied in similar experiments. The results are summarized below.

| Zinc chloride (g.) | 4-vinyl-pyridine (ml.) | Increase in weight of wool (percent) |
|---|---|---|
| 0.5 | 0.5 | 27 |
| 0.5 | 0.2 | 24 |
| 0.2 | 0.5 | 3 |
| 0.5 | 0.0 | 0 |

EXAMPLE II

Dried wool sample (Example I, 1.2 g.), 4-vinylpyridine (0.2 ml.), zinc chloride (0.5 g.), and acetone (10 ml.) were heated at 110° C. for 15 minutes. During this time the acetone was allowed to evaporate. The modified wool was extracted as in Example I and dried.

The experiment was repeated at different temperatures and for differing periods of time. The results are summarized below.

| Heating time (min.) | Temperature (° C.) | Increase in weight of wool (percent) |
|---|---|---|
| 15 | 110 | 5 |
| 30 | 110 | 20 |
| 60 | 110 | 22 |
| 15 | 120 | 19 |
| 30 | 140 | 22–24 |

EXAMPLE III

The dry wool (prepared as in Example I) was divided into two lots and treated as follows:

Lot A.—Dry wool sample (1.2 g.), 4-vinylpyridine (0.20 ml.), zinc chloride (0.5 g.), and acetone (10 ml.) were heated for 30 minutes at 120° C., such that all the acetone was allowed to evaporate.

Lot B.—Dry wool sample (1.2 g.), 4-vinylpyridine (0.16 ml.), zinc chloride (0.4 g.), and acetone (8 ml.) were heated for 15 minutes at 120° C., such that all the acetone was allowed to evaporate.

The wool modified in A and B was extracted as described in Example I and dried. Sample A showed an increase in weight of 24%; Sample B showed an increase of 10%.

Modified wool Samples A and B and an untreated sample of wool were measured and then violently agitated in an "Accelorotor" at 1700 r.p.m. for 6 minutes at 40° C. with 0.5% sodium oleate solution, using a liquor-to-wool ratio of 50 to 1. After this washing operation, the samples were remeasured to determine the area shrinkage. The improvement in shrinkage properties of wool modified in accordance with the invention is demonstrated by the following data:

Sample: Area shrinkage (percent)
    Modified wool A _____ −3 (expanded)
    Modified wool B _____ 6
    Unmodified wool samples _____ 35–48

Having thus described our invention, we claim:

1. A process for modifying wool, which comprises—
reacting wool, in the absence of added water, with a solution of
    an aromatic nitrogen heterocyclic compound having a vinyl group attached to the said heterocyclic ring, in an amount of about 10 to 100%, based on the weight of the wool, and
    zinc chloride, in an amount of about 20 to 100%, based on the weight of the wool,
in a suitable volatile organic solvent in an amount sufficient to allow facile application of the said ingredients to the wool,
at a temperature of about 60 to 150° C.,
for a time sufficient to obtain an increase in the weight of the wool of from 1 to 50%.

2. A process for modifying wool which comprises—
(a) distributing on a dry wool textile a solution of vinylpyridine and zinc chloride in an inert volatile organic solvent, the amount of vinyl-pyridine being about from 10 to 100% based on the weight of wool, the amount of zinc chloride being about from 20 to 100% based on the weight of wool,
(b) heating the so-treated wool at a temperature about from 60 to 120° C. while permitting the solvent to evaporate, and continuing the heating at said temperature whereby to effect a reaction of the wool with the applied co-reactants and to yield a product having a weight increase of 1 to 50%.

References Cited
UNITED STATES PATENTS

| | | | |
|---|---|---|---|
| 3,291,560 | 12/1966 | Machell et al. | 8—127.6 X |
| 3,216,781 | 11/1965 | Pardo, Jr., et al. | 8—127.6 |
| 2,826,581 | 3/1958 | Mahan et al. | 260—290 V |
| 1,762,011 | 6/1930 | Doser et al. | 8—128 R |
| 2,827,359 | 3/1958 | Kine et al. | 8—127.6 |

RICHARD D. LOVERING, Primary Examiner

U.S. Cl. X.R.

8—128 A, 128 R